United States Patent
Jang et al.

(10) Patent No.: US 8,223,225 B2
(45) Date of Patent: Jul. 17, 2012

(54) IMAGE PROCESSING APPARATUS, METHOD, AND RECORDING MEDIUM FOR REDUCING NOISE IN AN IMAGE

(75) Inventors: Soon-geun Jang, Suwon-si (KR); Jin-pyo Gwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 12/511,172

(22) Filed: Jul. 29, 2009

(65) Prior Publication Data

US 2010/0026856 A1 Feb. 4, 2010

(30) Foreign Application Priority Data

Aug. 1, 2008 (KR) .................. 10-2008-0075572

(51) Int. Cl.
*H04N 5/217* (2011.01)
(52) U.S. Cl. ..................... 348/241; 348/222.1
(58) Field of Classification Search .............. 348/222.1, 348/241; 382/162, 263, 266
See application file for complete search history.

(56) References Cited

U.S. PATENT DOCUMENTS

| 2004/0028271 A1* | 2/2004 | Pollard et al. ............. 382/162 |
| 2008/0101716 A1* | 5/2008 | Ho ............................ 382/266 |
| 2009/0161019 A1* | 6/2009 | Jang .......................... 348/663 |
| 2010/0111436 A1* | 5/2010 | Jung ......................... 382/263 |

* cited by examiner

*Primary Examiner* — Gevell Selby
(74) *Attorney, Agent, or Firm* — Drinker Biddle & Reath LLP

(57) ABSTRACT

An image processing method, apparatus and program for reducing noise in an image. The apparatus includes a low-frequency component extraction unit extracting a first low-frequency component from first image data, a noise reduction unit obtaining a second low-frequency component by applying a noise reduction filter to the first low-frequency component or data obtained by processing the first low-frequency component, a high-frequency component extraction unit extracting a first high-frequency component from the first images data and either one of the second low-frequency component and data obtained by processing the second low-frequency component, and the first image data, a high-frequency component tuning unit obtaining a second high-frequency component by tuning the first high-frequency component, and an image synthesis unit obtaining second image data by combining either one of the second low-frequency component and the data obtained by processing the second low-frequency component with the second high-frequency component.

18 Claims, 7 Drawing Sheets

IMAGE PROCESSING APPARATUS, METHOD, AND RECORDING MEDIUM FOR REDUCING NOISE IN AN IMAGE

CROSS-REFERENCE TO RELATED PATENT APPLICATION

This application claims the benefit of Korean Patent Application No. 10-2008-0075572, filed on Aug. 1, 2008, in the Korean Intellectual Property Office, the entire content of which is incorporated herein by reference.

BACKGROUND OF THE INVENTION

1. Field of the Invention

The present invention relates to an image processing method and apparatus, and a recording medium storing a program for executing the method. More particularly, the present invention relates to an image processing method and apparatus capable of effectively reducing noise in an image, and a recording medium storing a program for executing the method.

2. Description of the Related Art

In general, an image processing apparatus displays an image from image data on a display unit by reproducing an image file stored in a storage medium. A digital photographing apparatus, which is a type of image processing apparatus, photographs a subject in a shooting mode, stores image data regarding the subject in a storage medium, reproduces an image file from the storage medium, and then displays an image from the image data on a display unit.

If image data stored in the storage medium contains noise data, the noise is also displayed on a display unit, when such an image processing apparatus displays an image from the image data by reproducing the image file, thereby degrading the quality of the displayed image. Thus, there is a need to either display the image on the display unit by using the image processing apparatus so that noise is not present in the image from the image data or to basically process the image data. Also, when image data is obtained using a digital photographing apparatus, which is a type of image processing apparatus, the image data needs to be processed in order for an image from the image data not to include noise and then be stored in a storage medium.

FIG. 1 is a conceptual diagram schematically illustrating a first image containing noise. Conventionally, a bilateral filter is used to remove noise from an image but the resolution of a resultant image obtained by applying the bilateral filter to the image is degraded although noise is reduced therein. That is, in general, a noise reduction filter, such as the bilateral filter, reduces noise to approximately zero by averaging or weight-averaging data of pixels in a region having a predetermined size on an assumption that noise is evenly distributed. An edge may be generally understood in an image as the boundary between two subjects or a crease in a subject's clothes. The difference between the data value (brightness value) of a pixel at such an edge and the data value (brightness value) of a neighboring pixel is greater than the difference between the data values of adjacent pixels in a part of an image other than the edge. Thus, if the noise reduction filter is simply applied to the image, the difference between the data values of the pixel at the edge and the neighboring pixel decreases, thereby lowering the resolution of the image. FIG. 2 is a conceptual diagram schematically illustrating an image obtained by applying a noise reduction filter to the first image of FIG. 1.

Referring to FIG. 2, the texture of the clothes (knitwear) of a woman who is a subject is greatly degraded as shown.

SUMMARY OF THE INVENTION

The present invention provides an image processing method and apparatus for effectively reducing noise in an image, and a recording medium storing a program for executing the method.

Accordingly, an embodiment of the present invention provides an image processing apparatus including a low-frequency component extraction unit for extracting a first low-frequency component from first image data, a noise reduction unit for obtaining a second low-frequency component by applying a noise reduction filter to either the first low-frequency component or data obtained by processing the first low-frequency component, and a high-frequency component extraction unit for extracting a first high-frequency component from the first images data and either one of the second low-frequency component and data obtained by processing the second low-frequency component, and the first image data. The apparatus further comprises a high-frequency component tuning unit for obtaining a second high-frequency component by tuning the first high-frequency component, and an image synthesis unit for obtaining second image data by combining either one of the second low-frequency component and the data obtained by processing the second low-frequency component with the second high-frequency component.

The apparatus may further include a scale-down unit scaling down the first low-frequency component, and a scale-up unit scaling up the second low-frequency component. The noise reduction unit may obtain a second low-frequency component by applying a noise reduction filter to the scaled-down first low-frequency component. The high-frequency component extraction unit may extract the first high-frequency component from the scaled-up second low-frequency component and the first image data. The image synthesis unit may obtain second image data by combining the scaled-up second low-frequency component and the second high-frequency component.

The low-frequency component extraction unit may include a low-pass filter. The noise reduction unit may include a bilateral filter.

The high-frequency component extraction unit may obtain the first high-frequency component by using the difference between the first image data and the second low-frequency component. The high-frequency component extraction unit may obtain the first high-frequency component by using the difference between the first image data and the scaled-up second low-frequency component. The high-frequency component tuning unit may obtain the second high-frequency component by tuning the first high-frequency component to reduce amplitude of the first high-frequency component.

Another embodiment of the present invention provides an image processing method including the operations of extracting a first low-frequency component from first image data, obtaining a second low-frequency component by applying a noise reduction filter to the first low-frequency component; obtaining a first high-frequency component from the first image data and the second low-frequency component; obtaining a second high-frequency component by tuning the first high-frequency component, and obtaining second image data by combining the second low-frequency component with the second high-frequency component. A further embodiment of the present invention provides an image processing method including the operations of extracting a first low-frequency component from first image data; scaling down the first low-frequency component, obtaining a second low-frequency component by applying a noise reduction filter to the scaled-down first low-frequency component; scaling up the second low-frequency component, and obtaining a first high-frequency component from the first image data and the scaled-up second low-frequency component. The method further includes the operations of obtaining a second high-frequency component by tuning the first high-frequency component, and obtaining second image data by combining the scaled-up second low-frequency component with the second high-frequency component.

A low-pass filter may be used in the extracting of the first low-frequency component. A bilateral filter may be used in the obtaining of the second low-frequency component.

The obtaining of the first high-frequency component may include obtaining the first high-frequency component by using the difference between the first image data and the second low-frequency component, or may include obtaining the first high-frequency component by using the difference between the first image data and the scaled-up second low-frequency component. The obtaining of the second high-frequency component may include obtaining the second high-frequency component by tuning the first high-frequency component to reduce amplitude of the first high-frequency component.

Another embodiment of the present invention provides a computer readable medium having recorded thereon a computer program for executing the above method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described in detail with reference to the attached drawings.

Figure 3:
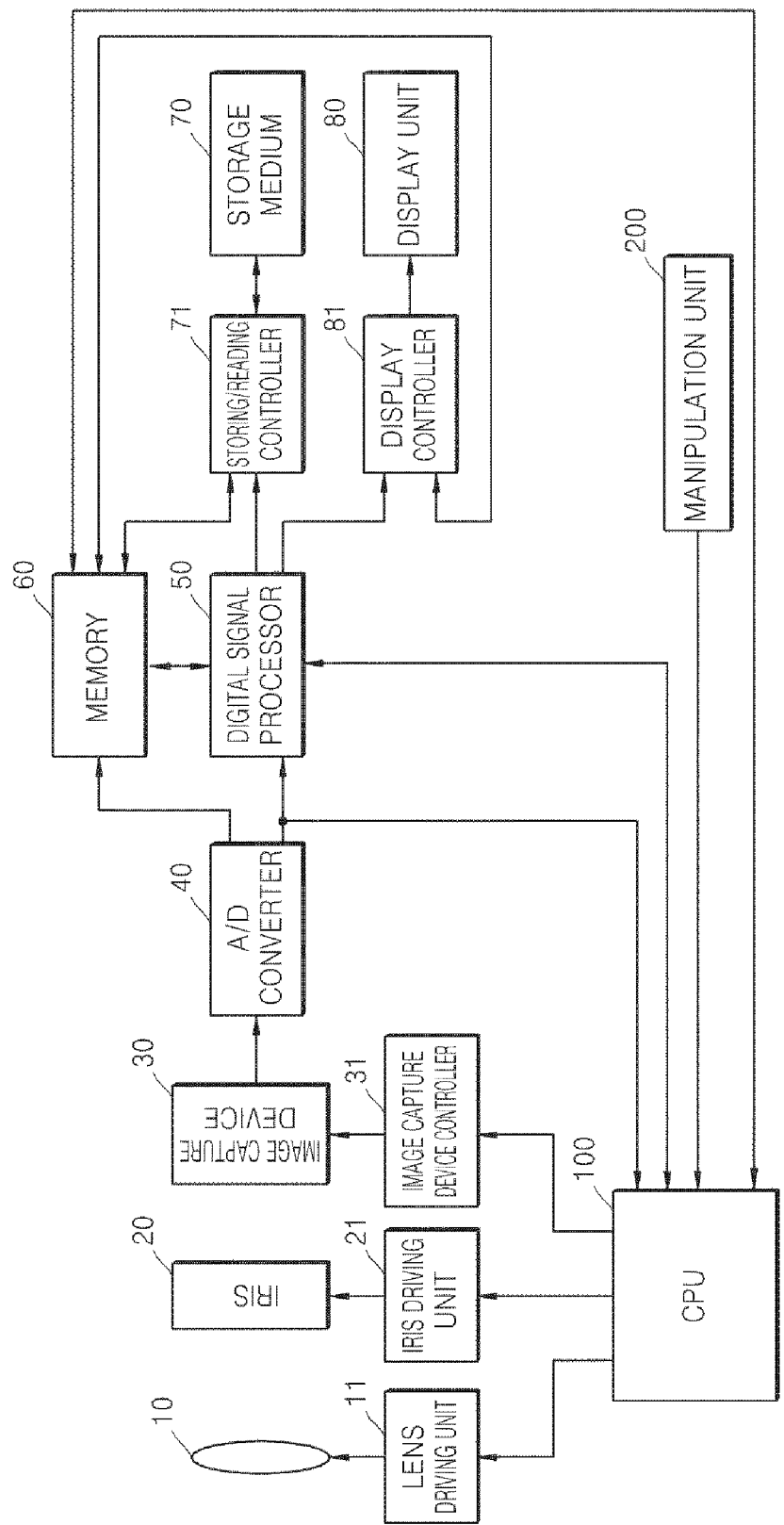
FIG. 3 is a block diagram schematically illustrating a digital photographing apparatus according to an embodiment of the present invention.

FIG. 3 is a block diagram schematically illustrating an example of a digital photographing apparatus, according to an embodiment of the present invention.

Figure 4:
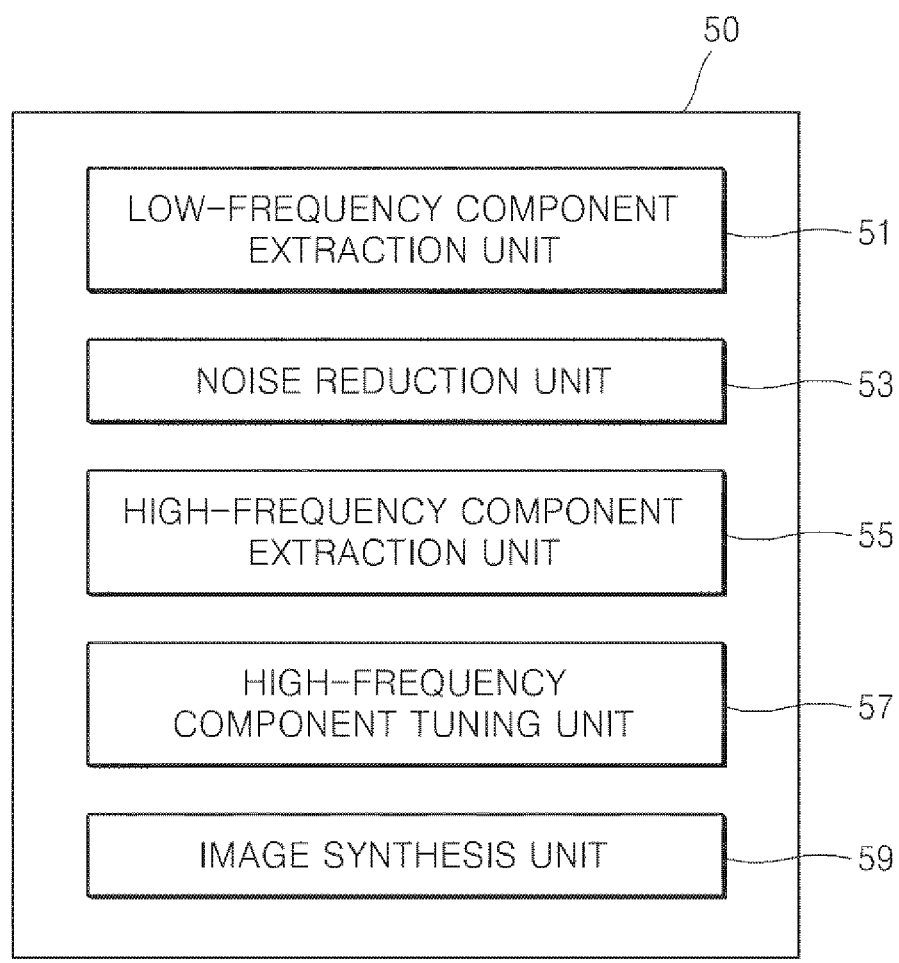
FIG. 4 is a block diagram schematically illustrating an example of a digital signal processor (DSP) of the digital photographing apparatus of FIG. 3, according to an embodiment of the present invention.

FIG. 4 is a block diagram schematically illustrating an example of a digital signal processor (DSP) 50 of the digital photographing apparatus illustrated in FIG. 3, according to an embodiment of the present invention.

All operations of the digital photographing apparatus can be controlled by a central processing unit (CPU) 100. The digital photographing apparatus includes a manipulation unit 200 having keys generating an electrical signal in response to a user's instruction. The electrical signal generated by the manipulation unit 200 is delivered to the CPU 100 so that the CPU 100 can control the digital photographing apparatus in response to the electrical signal.

In a shooting mode, if an electrical signal generated in response to a user's instructions is input to the CPU 100, the CPU 100 analyzes the electrical signal and controls a lens driving unit 11, an iris driving unit 21, and an image capture device controller 31, thus controlling the location of a lens 10, the degree of openness of an iris 20, and the sensitivity of an image capture device 30, respectively. The image capture device 30 generates image data from received light. An analog/digital (A/D) converter 40 converts analog data received from the image capture device 30 into digital data. The A/D converter 40 may be omitted depending on the characteristics of the image capture device 30.

Data output from the image capture device 30 is provided to the DSP 50 via a memory 60 or not via the memory 60. If necessary, the data output from the image capture device 30 may also be provided to the CPU 100. Here, the memory 60 includes a read-only memory (ROM) or a random access memory (RAM). The DSP 50 can perform digital signal processing, such as gamma correction or white balance correction, if needed. As illustrated in FIG. 4, the DSP 50 may include a low-frequency component extraction unit 51, a noise reduction unit 53, a high-frequency component extraction unit 55, a high-frequency component tuning unit 57 and an image synthesis unit 59 but they may be variously installed, e.g., be installed separately from the DSP 50. That is, according to another embodiment, the low-frequency component extraction unit 51, the noise reduction unit 53, the high-frequency component extraction unit 55, the high-frequency component tuning unit 57 and the image synthesis unit 59 may be included in various locations in the digital photographing apparatus.

Data output from the DSP 50 is delivered to a display controller 81 directly or via the memory 60. The display controller 81 controls a display unit 80 in order to display an image on the display unit 80. Image data output from the DSP 50 is input to a storing/reading controller 71 directly or via the memory 60. The storing/reading controller 71 stores the image data in a storage medium 70, in response to a signal received from the user or automatically. Alternatively, the storing/reading controller 71 may interpret image data from an image file stored in the storage medium 70, and provide the interpretation result to the display controller 81 via the memory 60 or via another path so that an image can be displayed on the display unit 80. The storage medium 70 can be easily attached to and detached from the digital photographing apparatus or be fixedly built into the digital photographing apparatus.

Examples of the functions of the low-frequency component extraction unit 51, the noise reduction unit 53, the high-frequency component extraction unit 55, the high-frequency component tuning unit 57 and the image synthesis unit 59 will now be described with reference to FIG. 4.

Figure 1:
FIG. 1 is a conceptual diagram schematically illustrating a first image containing noise.
Figure 2:
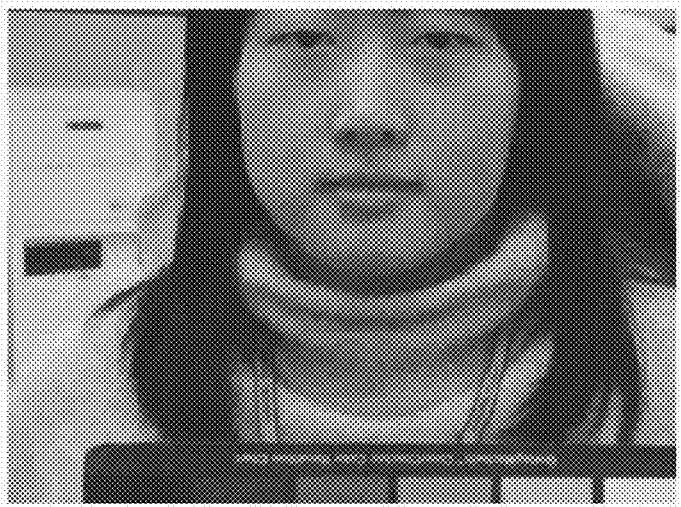
FIG. 2 is a conceptual diagram schematically illustrating an image obtained by applying a noise reduction filter to the first image of FIG. 1.

First, the low-frequency component extraction unit 51 extracts a first low-frequency component from first image data corresponding to a first image, as illustrated in FIG. 1. To this end, the low-frequency component extraction unit 51 may use a low-pass filter. Alternatively, a high-frequency component may be extracted from the first image data by using a high-pass filter and a first low-frequency component may be extracted from the difference between the first image data and the high-frequency component.

Figure 5A:
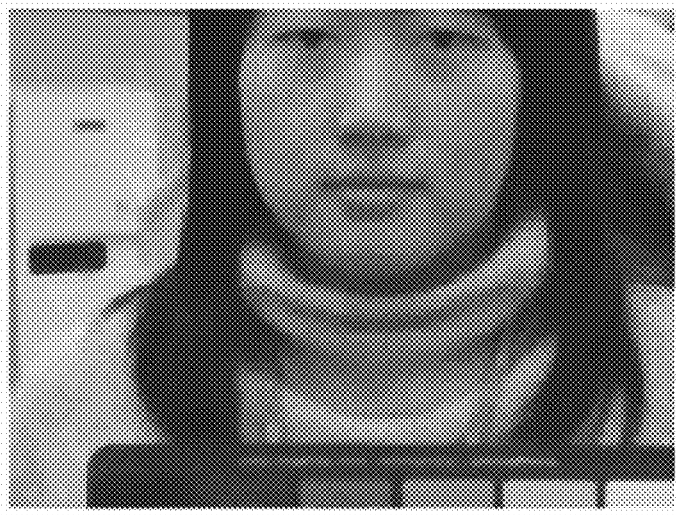
FIG. 5A is a conceptual diagram schematically illustrating an example of an image according to edge data obtained from the first image of FIG. 1.

FIG. 5A is a conceptual diagram schematically illustrating an example of an image according to the first low-frequency component extracted by the low-frequency component extraction unit 51. As illustrated in FIG. 5A, edges in the image according to the first low-frequency component are less clear than in the first image of FIG. 1, and thus, the resolution of the overall image is degraded.

The noise reduction unit 53 obtains a second low-frequency component by applying a noise reduction filter to the extracted first low-frequency component. That is, the second low-frequency component is obtained by reducing noise data in the first low-frequency component. The noise reduction unit 53 may be embodied as a bilateral filter.

The high-frequency component extraction unit 55 extracts a first high-frequency component from the second low-frequency component and the first image data. For example, the high-frequency component extraction unit 55 extracts a first high-frequency component by using the difference between the second low-frequency component and the first image data. Here, the first high-frequency component is different from data obtained by applying a high-pass filter to the first image data.

Figure 5B:
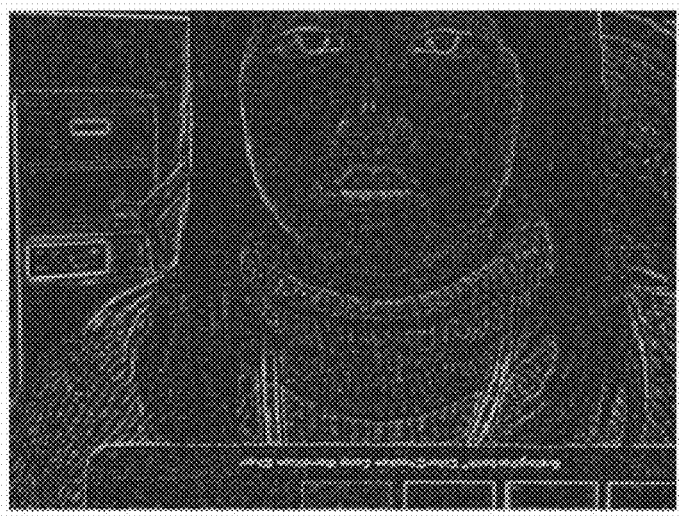
FIG. 5B is a conceptual diagram schematically illustrating an example of an image according to edge data obtained from the second image of FIG. 2.

The data obtained by applying a high-pass filter to the first image data corresponds to the difference between the first image data and the first low-frequency component rather than the difference between the first image data and the second low-frequency component. As described above, the second low-frequency component may be considered as being obtained by reducing noise data from the first low-frequency component. When the noise reduction unit 53 reduces the noise data from the first low-frequency component, data, regarding the minute edges, in the first low-frequency component may also be lost. The high-frequency component extraction unit 55 obtains the first high-frequency component from the first image data and the second low-frequency component, and thus, the first high-frequency component contains the data regarding the lost minute edges that are present in the first image data but are not present in the second low-frequency component. FIG. 5B is a conceptual diagram schematically illustrating an example of an image according to the first high-frequency component. Here, the "minute edges" may represent the texture of the clothes of or noise in the background of the woman who is the subject in the first image of FIG. 1. In contrast, strong edges according to a high-frequency component that is obtained by applying the high-pass filter to the first image may represent the boundary between subjects.

The high-frequency component tuning unit 57 obtains a second high-frequency component by tuning the extracted first high-frequency component. That is, the high-frequency component tuning unit 57 may obtain the second high-frequency component by tuning the first high-frequency component to reduce the amplitude of the first high-frequency component.

Figure 6A:
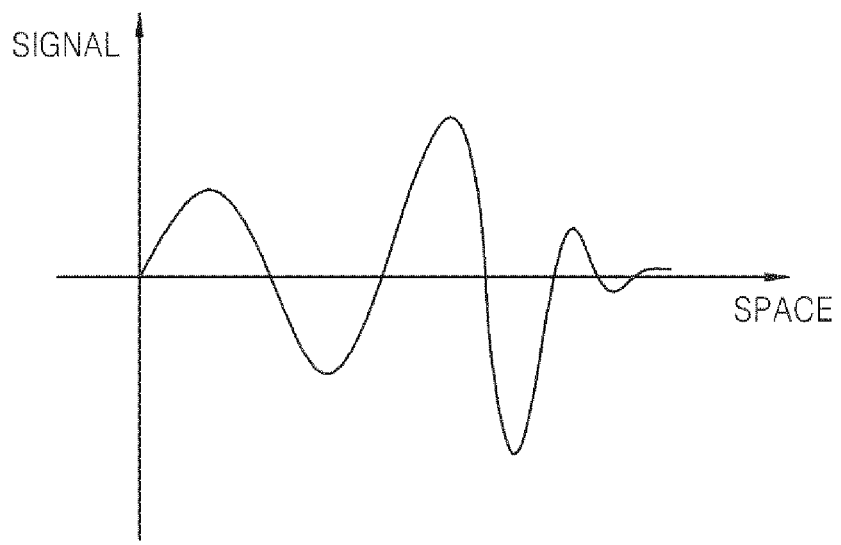
FIG. 6A is a graph conceptually illustrating an example of an ideal first high-frequency component that does not contain noise.
Figure 6B:
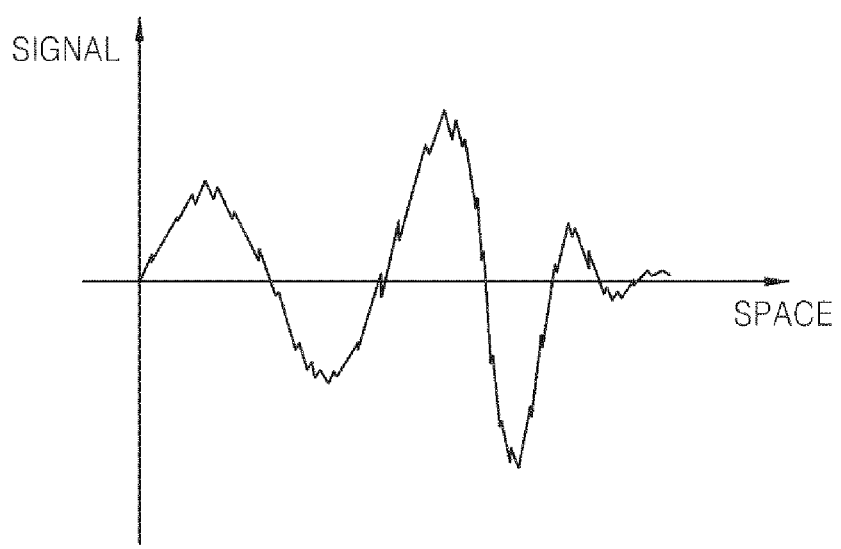
FIG. 6B is a graph conceptually illustrating an example of a first high-frequency component that contains noise data.
Figure 6C:
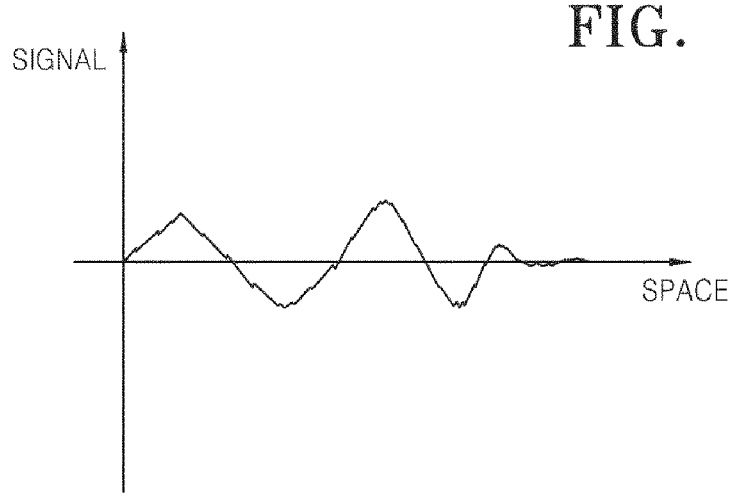
FIG. 6C is a graph conceptually illustrating an example of a second high-frequency component obtained by tuning the first high-frequency component illustrated in FIG. 6B.

FIG. 6A is a graph conceptually illustrating an example of an ideal first high-frequency component that does not contain noise. FIG. 6B is a graph conceptually illustrating an example of a first high-frequency component that contains noise data. FIG. 6C is a graph conceptually illustrating an example of a second high-frequency component obtained by tuning the first high-frequency component illustrated in FIG. 6B. A comparison of the graphs of FIGS. 6A and 6B shows that the noise data distorts the waveform of the first high-frequency component that does not contain noise.

Unlike in FIG. 6A, the first high-frequency component actually contains noise data, as illustrated in FIG. 6B. The second low-frequency component is obtained by reducing noise data therefrom via the noise reduction unit 53 as described above. If the noise reduction filter is applied to the first high-frequency component in order to reduce noise data therefrom, data representing minute edges in such a first image, which is lost during the obtaining of the second low-frequency component but is included in the first high-frequency component, may be lost. Accordingly, the second high-frequency component is obtained by tuning the first high-frequency component rather than by applying the noise reduction filter to the first high-frequency component. More specifically, referring to FIG. 6C, the second high-frequency component is obtained by turning the first high-frequency component of FIG. 6b to reduce the amplitude of the first high-frequency component. A comparison of the graphs of FIGS. 6B and 6C shows that the degree of distortion in the second high-frequency component is lessened. Thus if the second high-frequency component of FIG. 6C is used, noise can be reduced in a final image. Also, since the second high-frequency component still contains the data regarding the minute edges, the minute edges are present in the final image, thereby preventing the resolution of the overall image from degrading.

The image synthesis unit 59 obtains second image data by combining the second low-frequency component with the second high-frequency component. The resolution of a second image from the second image data is not degraded while noise therein is reduced, not like in the first image illustrated in FIG. 1.

The image processing apparatus, according to the current embodiment is a digital photographing apparatus as illustrated in FIG. 3 and thus is capable of processing image data obtained through photographing, and storing in the storage medium 70 image data corresponding to an image in which noise is reduced. However, the present invention is not limited to this arrangement, and may also be applied to other types of image processing apparatuses, such as a personal digital assistant (PDA) and a personal multimedia player (PMP).

Figure 7:
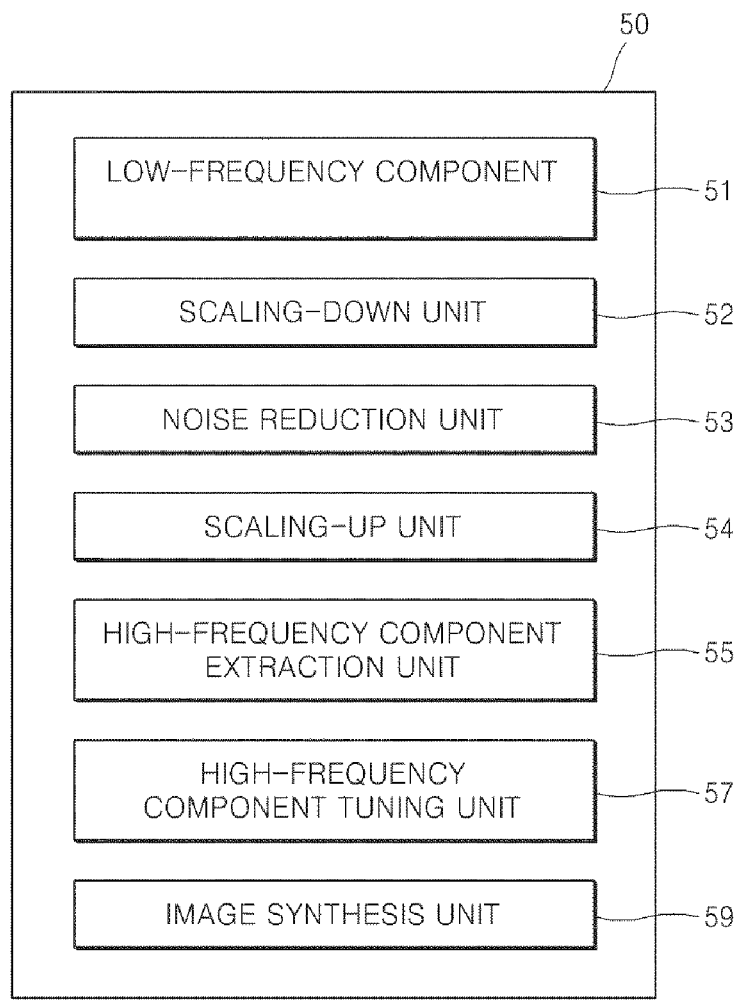
FIG. 7 is a block diagram schematically illustrating an example of a DSP of the digital photographing apparatus of FIG. 3, according to another embodiment of the present invention.

FIG. 7 is a block diagram schematically illustrating an example of the DSP 50 of the digital photographing apparatus of FIG. 3, according to another embodiment of the present invention. The DSP 50, according to this embodiment of the present invention, further includes a scale-down unit 52 and a scale-up unit 54, as compared to the DSP 50 illustrated in FIG. 4.

The low-frequency component extraction unit 51 extracts a first low-frequency component from first image data corresponding to a first image as illustrated in FIG. 1. To this end, the low-frequency component extraction unit 51 may be embodied as a low-pass filter. Alternatively, a high-frequency component may be extracted from the first image data by using a high-pass filter and then the first low-frequency component may be extracted from the difference between the first image data and the high-frequency component.

Figure 8A:
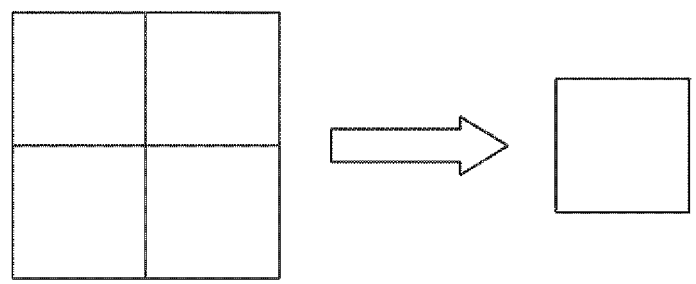
FIG. 8A is a conceptual diagram schematically illustrating an example of scaling down of a first low-frequency component according to an embodiment of the present invention.

The scale-down unit 52 scales-down the first low-frequency component. As illustrated in FIG. 8A, scaling-down means unifying data of four pixels by performing an averaging or weight-averaging operation thereon. However, scaling-down may be performed through sub-sampling The noise reduction unit 53 obtains a second low-frequency component by applying a noise reduction filter to the scaled-down first low-frequency component, unlike the noise reduction unit 53 of FIG. 4. That is, the second low-frequency component is obtained by reducing noise from the first low-frequency component. Also, the noise reduction unit 53 may be embodied as a bilateral filter.

Figure 8B:
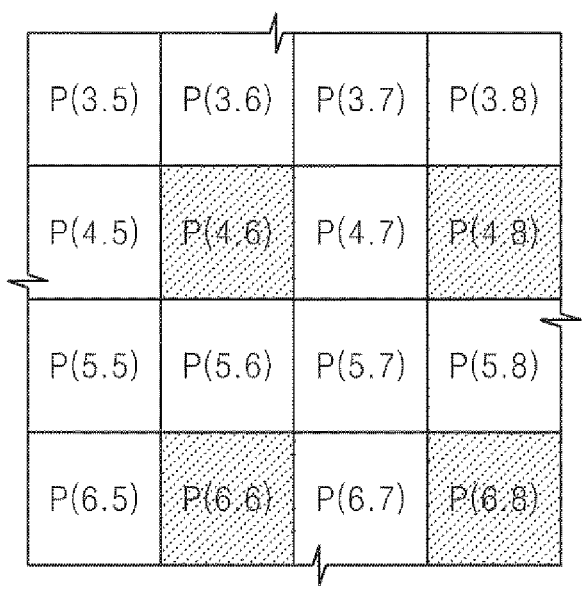
FIG. 8B is a conceptual diagram schematically illustrating an example of scaling up of a second low-frequency component according to an embodiment of the present invention.

The scale-up unit 54 scales up the second low-frequency component. As illustrated in FIG. 8B, on an assumption that four adjacent pixels in a second low-frequency component are P(4,6), P(4,8), P(6,6) and P(6,8), scaling up means that data of pixels other than the four adjacent pixels is synthesized using the data of the four adjacent pixels. For example, data of a pixel P(4,7) may be obtained by averaging or weight-averaging the data of the pixels P(4,6) and P(4,8), and data of a pixel P(5,7) may be obtained by averaging or weight-averaging the data of the pixels P(4,6), P(4,8), P(6,6) and P(6,8). However, a method in which the scale-up unit 54 scales-up the second low-frequency component is not limited to the above description and may be variously designed.

The high-frequency component extraction unit 55 extracts a first high-frequency component from the scaled-up second low-frequency component and the first image data. For example, the high-frequency component extraction unit 55 extracts the first high-frequency component by using the difference between the scaled-up second low-frequency component and the first image data. Here, the first high-frequency component is different from data obtained by applying a high-pass filter to the first image data as described above with reference to the digital photographing apparatus illustrated in FIG. 3.

The high-frequency component tuning unit 57 obtains a second high-frequency component by tuning the extracted first high-frequency component. In detail, the high-frequency component tuning unit 57 may obtain the second high-frequency component by tuning the extracted first high-frequency component to reduce the amplitude of the first high-frequency component as described above with reference to the digital photographing apparatus illustrated in FIG. 3. The image synthesis unit 59 obtains second image data by combining the scaled-up second low-frequency component and the second high-frequency component obtained by the high-frequency component tuning unit 57.

In particular, the digital photographing apparatus according to the this embodiment can effectively reduce noise from an image containing a large amount of noise. That is, the scale-down unit 52 scales down the first low-frequency component extracted by the low-frequency component extraction unit 51 and then the noise reduction unit 53 reduces noise in the scaled-down first low-frequency component. In this case, noise is generally, evenly distributed and thus noise data offsets each other during the scaling down of the first low-frequency component, since the value of the noise data becomes or approximates zero when scaling down is performed by averaging or weight-averaging data of pixels in a region having a predetermined size. If the scale-down unit 52 scales down the first low-frequency component by using sub-sampling, sub-sampling also makes the noise data be sub-sampled, thereby reducing the amount of noise data in the scaled-down first low-frequency component. Accordingly, the amount of noise data is reduced in the scaled-down first low-frequency component before the noise reduction unit 53 reduces noise, and then the noise reduction unit 53 reduces noise from the scaled-down first low-frequency component, thereby effectively reducing noise.

A part of the first low-frequency component may be lost while data is scaled down by the scale-down unit 52 or is scaled up by the scale-up unit 54. However, the high-frequency component extraction unit 55 obtains the first high-frequency component from the finally scaled-up second low-frequency component and the first image data, and thus, the lost part of the first low-frequency component is included in the first high-frequency component, thereby effectively preventing the quality of the final second image from degrading.

An image processing method according to an embodiment of the present invention will now be described. First, a first low-frequency component is extracted from first image data by using, for example, a low-pass filter, and a second low-frequency component is obtained by applying a noise reduction filter, e.g., a bilateral filter, to the first low-frequency component. Then, a first high-frequency component is obtained from the first image data and the second low-frequency component, and a second high-frequency component is obtained by tuning the first high-frequency component. For example, the second high-frequency component may be obtained by turning the first high-frequency component to reduce the amplitude of the first high-frequency component. The first high-frequency component may be obtained by using the difference between the first image data and the second low-frequency component. Then, second image data is obtained by combining the second low-frequency component with the second high-frequency component. Accordingly, it is possible to obtain second image data regarding a second image that is obtained by reducing noise in a first image from the first image data.

An image processing method according to another embodiment of the present invention will now be described. First, a first low-frequency component is extracted from first image data by using, for example, the low-pass filter, and the first low-frequency component is scaled down. Next, a second low-frequency component is obtained by applying a noise reduction filter, such as the bilateral filter, to the scaled-down first low-frequency component, and the second low-frequency component is scaled up. Then, a first high-frequency component is obtained from the first image data and the scaled-up second low-frequency component, and a second high-frequency component is obtained by tuning the first high-frequency component. For example, the second high-frequency component may be obtained by tuning the first high-frequency component to reduce the amplitude of the first high-frequency component. The first high-frequency component may be obtained using the difference between the first image data and the scaled-up second low-frequency component. Then second image data is obtained by combining the scaled-up second low-frequency component with the second high-frequency component. Accordingly, it is possible to obtain second image data regarding a second image that is obtained by reducing noise in a first image from the first image data.

With the image processing methods according to the above embodiments, it is possible to effectively reduce noise in an image without degrading the resolution of the image.

A program that executes in an image processing apparatus and the image processing methods according to the above embodiments of the present invention and/or modified examples thereof may be stored in a recording medium. For example, the recording medium may be embodied as the storage medium 70 or the memory 60 of FIG. 3, or an additional type of recording medium. Examples of the recording medium include a magnetic recording medium, e.g., a read-only memory (ROM), a floppy disc, or a hard disc, and an optical recording medium, e.g., a compact disc (CD)-ROM or a digital versatile disc (DVD). As described above, according to an image processing method and apparatus and a recording medium storing a program for executing the method, it is possible to effectively reduce noise in an image.

While this invention has been particularly shown and described with reference to exemplary embodiments thereof, it will be understood by one skilled in the art that various changes in form and details may be made therein without departing from the spirit and scope of the invention as defined by the appended claims.

What is claimed is:

1. An image processing apparatus comprising:
    a low-frequency component extraction unit for extracting a first low-frequency component from first image data;
    a noise reduction unit for obtaining a second low-frequency component by applying a noise reduction filter to either the first low-frequency component or data obtained by processing the first low-frequency component;
    a high-frequency component extraction unit for extracting a first high-frequency component from the first images data and either one of the second low-frequency component and data obtained by processing the second low-frequency component, and the first image data;
    a high-frequency component tuning unit for obtaining a second high-frequency component by tuning the first high-frequency component to reduce amplitude of the first high-frequency component; and
    an image synthesis unit for obtaining second image data by combining either one of the second low-frequency component and the data obtained by processing the second low-frequency component with the second high-frequency component.

2. The apparatus of claim 1, further comprising:
    a scale-down unit for scaling down the first low-frequency component; and
    a scale-up unit for scaling up the second low-frequency component,
    wherein the noise reduction unit obtains a second low-frequency component by applying a noise reduction filter to the scaled-down first low-frequency component,
    the high-frequency component extraction unit extracts the first high-frequency component from the scaled-up second low-frequency component and the first image data, and
    the image synthesis unit obtains second image data by combining the scaled-up second low-frequency component and the second high-frequency component.

3. The apparatus of claim 1, wherein the low-frequency component extraction unit comprises a low-pass filter.

4. The apparatus of claim 1, wherein the noise reduction unit comprises a bilateral filter.

5. The apparatus of claim 1, wherein the high-frequency component extraction unit obtains the first high-frequency component by using the difference between the first image data and the second low-frequency component.

6. The apparatus of claim 2, wherein the high-frequency component extraction unit obtains the first high-frequency component by using the difference between the first image data and the scaled-up second low-frequency component.

7. An image processing method comprising:
    extracting a first low-frequency component from first image data;
    obtaining a second low-frequency component by applying a noise reduction filter to the first low-frequency component;
    obtaining a first high-frequency component from the first image data and the second low-frequency component;
    obtaining a second high-frequency component by tuning the first high-frequency component to reduce amplitude of the first high-frequency component; and
    obtaining second image data by combining the second low-frequency component with the second high-frequency component.

8. The method of claim 7, wherein a low-pass filter is used in the extracting of the first low-frequency component.

9. The method of claim 7, a bilateral filter is used in the obtaining of the second low-frequency component.

10. The method of claim 7, wherein the obtaining of the first high-frequency component comprises obtaining the first high-frequency component by using the difference between the first image data and the second low-frequency component.

11. A computer readable medium having recorded thereon a program for controlling a computer to perform the following operations:
    extract a first low-frequency component from first image data;
    obtain a second low-frequency component by applying a noise reduction filter to the first low-frequency component;
    obtain a first high-frequency component from the first image data and the second low-frequency component;
    obtain a second high-frequency component by tuning the first high-frequency component to reduce amplitude of the first high-frequency component; and
    obtain second image data by combining the second low-frequency component with the second high-frequency component.

12. An image processing method comprising:
    extracting a first low-frequency component from first image data;
    scaling down the first low-frequency component;
    obtaining a second low-frequency component by applying a noise reduction filter to the scaled-down first low-frequency component;
    scaling up the second low-frequency component;
    obtaining a first high-frequency component from the first image data and the scaled-up second low-frequency component;
    obtaining a second high-frequency component by tuning the first high-frequency component; and
    obtaining second image data by combining the scaled-up second low-frequency component with the second high-frequency component.

13. The method of claim 12, wherein a low-pass filter is used in the extracting of the first low-frequency component.

14. The method of claim 12, wherein a bilateral filter is used in the obtaining of the second low-frequency component.

15. The method of claim 12, wherein the obtaining of the first high-frequency component comprises obtaining the first high-frequency component by using the difference between the first image data and the scaled-up second low-frequency component.

16. The method of claim 12, wherein the obtaining of the second high-frequency component comprises obtaining the second high-frequency component by tuning the first high-frequency component to reduce amplitude of the first high-frequency component.

17. A computer readable medium having recorded thereon a computer program for controlling a computer to perform the following operations:

extract a first low-frequency component from first image data;

scale down the first low-frequency component;

obtain a second low-frequency component by applying a noise reduction filter to the scaled-down first low-frequency component;

scale up the second low-frequency component;

obtain a first high-frequency component from the first image data and the scaled-up second low-frequency component;

obtain a second high-frequency component by tuning the first high-frequency component; and obtain second image data by combining the scaled-up second low-frequency component with the second high-frequency component.

18. A computer readable medium of claim 17, wherein the obtaining of the first high-frequency component comprises obtaining the first high-frequency component by using the difference between the first image data and the scaled-up second low-frequency component.

* * * * *